United States Patent [19]
Prinz et al.

[11] Patent Number: 5,301,863
[45] Date of Patent: Apr. 12, 1994

[54] AUTOMATED SYSTEM FOR FORMING OBJECTS BY INCREMENTAL BUILDUP OF LAYERS

[76] Inventors: Fritz B. Prinz, 5801 Northumberland St.; Lee E. Weiss, 6558 Darlington Rd., both of Pittsburgh, Pa. 15217

[21] Appl. No.: 971,308

[22] Filed: Nov. 4, 1992

[51] Int. Cl.$^5$ .................... B23K 10/02; C23C 26/00
[52] U.S. Cl. .................... 228/33; 228/102; 228/215; 228/261; 29/791; 164/46; 156/59
[58] Field of Search .................. 228/47, 261, 215, 125, 228/102, 33, 43, 190; 29/791, 792, 492; 164/46; 118/719, 724, 725; 156/59

[56] References Cited

U.S. PATENT DOCUMENTS

| | | | |
|---|---|---|---|
| 3,156,968 | 11/1964 | White | 29/123 |
| 4,665,492 | 5/1987 | Masters | 264/40.1 X |
| 4,673,075 | 6/1987 | Ueyama | 29/791 X |
| 4,752,352 | 6/1988 | Feygin | 156/638 |
| 4,825,808 | 5/1989 | Takahashi et al. | 118/719 |
| 5,126,529 | 6/1992 | Weiss et al. | 164/46 X |
| 5,134,569 | 7/1992 | Masters | 364/474 |

FOREIGN PATENT DOCUMENTS 88312323.4  6/1989  European Pat. Off. .

OTHER PUBLICATIONS

"A Rapid Tool Manufacturing System Based on Stereolithography and Thermal Spraying" by Lee E. Weiss, E. Levent Gursoz, F. Prinz, Paul S. Fussell, Swami Mahalingham and E. P. Patrick, published by the American Society of Mechanical Engineers, vol. 3, No. 1, Mar., 1990.

*Primary Examiner*—Kurt C. Rowan
*Assistant Examiner*—Jeanne M. Elpel
*Attorney, Agent, or Firm*—Buchanan Ingersoll

[57] ABSTRACT

A system and method for manufacturing an article that is formed by the incremental buildup of layers on a work surface contains a material deposition station to deposit the layers. In addition, a plurality of processing stations are employed. Each processing station performs a separate function such that when the functions are performed in series, a layer of the article is produced and is prepared for the deposition of the next layer. An article transfer apparatus repetitively moves the work surface and any layers formed thereon selectively among the deposition station and the processing stations. The article transfer apparatus continues to move between the processing stations until each layer is processed and a completely manufactured article is produced.

19 Claims, 2 Drawing Sheets

AUTOMATED SYSTEM FOR FORMING OBJECTS BY INCREMENTAL BUILDUP OF LAYERS

BACKGROUND OF THE INVENTION

1. Field of the Invention

The invention relates to a method and apparatus for creating a three-dimensional object by the formation of layers of a deposited material.

2. Description of the Prior Art

Several methods have been proposed for creating three-dimensional objects by incremental buildup of thin layers. In our U.S. Pat. No. 5,126,529 we disclosed a method of producing articles by spray deposition using a series of masks to define cross sectional layers which form the article. In the method there disclosed the article is fully formed with an adjacent complimentary material that is removed after the article has been completely formed. Metal tubular shapes have been made by shape melting. Shape melting is a process whereby structural components are manufactured by depositing weld material layer-upon-layer until the desired geometry is achieved. Weld build up operations like shape melting require a preform which is generally a machined piece of metal onto which the first layer of build up is deposited. One example of this type of manufacture is disclosed in U.S. Pat. No. 3,156,968 to W. D. White, Jr.

In nearly all of the prior art methods for forming articles by incremental build up of layers, the article is first fully formed in a forming station. Then the article is moved for subsequent processing such as machining to a finished form. Cubitol in European Patent Application No. 88312323.4 discloses a system for forming plastic articles by applying layers of plastic which are cured and milled before the next layer is applied. As in other prior art layer deposition processes, the equipment used is a dedicated system which cannot be expanded to include other processing stations. In our pending U.S. patent applications Ser. Nos. 07/737,229, now U.S. Pat. No. 5,207,371, and 07/829,767 and our issued U.S. Pat. No. 5,126,529 we teach that it is often desirable to process individual layers before depositing successive layers thereon. Such processing could include heat treatment, shaping or shot peening. Hence, any system which forms articles, particularly metal articles, by incremental build up of layers should have the capability to be expanded to include additional processing stations.

In our issued patent we teach that various heads designed to provide each of the desired operations could be mounted on a movable platform so that each operation could be done without moving the workpiece as it is being made. However, this may not be practical as it will require the creation of specialized equipment. A better approach is to use and customize existing equipment such as computer numerically controlled (CNC) machines to do shaping, a heat treatment oven to provide heat treating as well as other equipment which perform other operations. Such available equipment cannot be used on a cost effective basis without automated handling of the workpiece to repeatedly place and remove the workpiece in each of the selected stations. Although automated systems have been developed which perform single operations on a part as it moves along an assembly line, or which transfers parts from one location to another, there is no system available which provides repetitive movement of the same workpiece into and out of the same operational stations.

SUMMARY OF THE INVENTION

We provide a method and assembly for manufacturing an article that is formed by the incremental buildup of layers on a movable work surface. During the fabrication of an article by the buildup of layers, each layer represents a cross sectional slice of a three dimensional object being built and is composed of the desired deposition material. In addition to the deposition material, each layer may also contain a second portion that acts as a complement of the object shape of the deposition material portion and serves as a support structure for the growing object form. The deposition material and support structure material are each applied in a predetermined sequence. In this way, a layered structure is built up which contains the object made of the deposition material surrounded by the complementary material. The complementary material may be a mask or may be a material that is applied adjacent to the deposition material layers.

During the manufacture of an article by the buildup of layers, several operations are performed on the work piece for each layer. Therefore, in addition to a material deposition station, a plurality of processing stations are employed. Each processing station performs at least one separate function The functions could include any combination of shot peening, cleaning, blasting, heat treating, shaping, inspection, mask making and packaging. Furthermore, additional stations can be added as desired.

An article transfer apparatus repetitively moves the work surface and any layers formed thereon selectively between the deposition station and the processing stations. This repetitive movement continues until all layers are deposited and processed and a completely formed article is produced.

In the preferred embodiment, the means of depositing the layers is by thermal spray deposition. Thus, in this embodiment, the material deposition station would include a thermal spray deposition assembly. The layers could also be deposited by other suitable deposition means, such as by weld deposition.

Other details, objects and advantages of the invention will become apparent as the following description of certain present preferred embodiments thereof proceeds.

DETAILED DESCRIPTION OF THE PREFERRED EMBODIMENT

Figure 1:
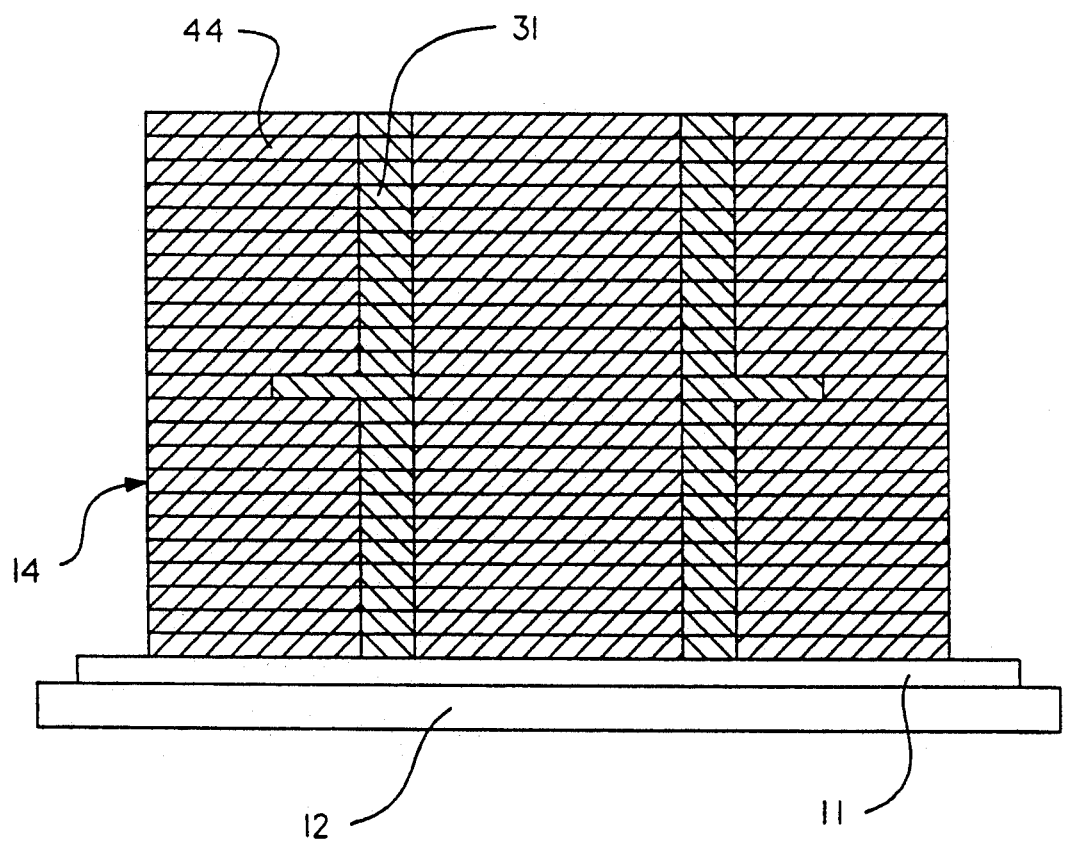
FIG. 1 is a sectional view of a block of layers of deposition material and complementary material built up on a substrate placed on a work surface to form a tubular article.

In FIG. 1, a cross section of a block containing a tubular article manufactured by layer deposition is shown. The article is formed by depositing layers 14 of deposition material 31 and complementary material 44 upon a substrate 11 positioned on a movable pallet or work surface 12. The material of which the article is fabricated is the deposition material 31. In the present system, any means of delivering the deposition material 31 is acceptable. However, in the preferred embodiment of the present invention, we employ a thermal spray deposition means. The deposition material 31 may be any suitable material such as metal, metal alloy or plastic. The preferred embodiment also employs a set of masks over which the deposition material is sprayed. The set of masks contain at least one mask corresponding to each cross section through the article such that there is at least one mask in the set for every parallel cross section normal to a center line through the article. The masks are positioned over the movable work surface 12 and can remain in place during manufacturing to form a complement to the layers being deposited.

Figure 2:
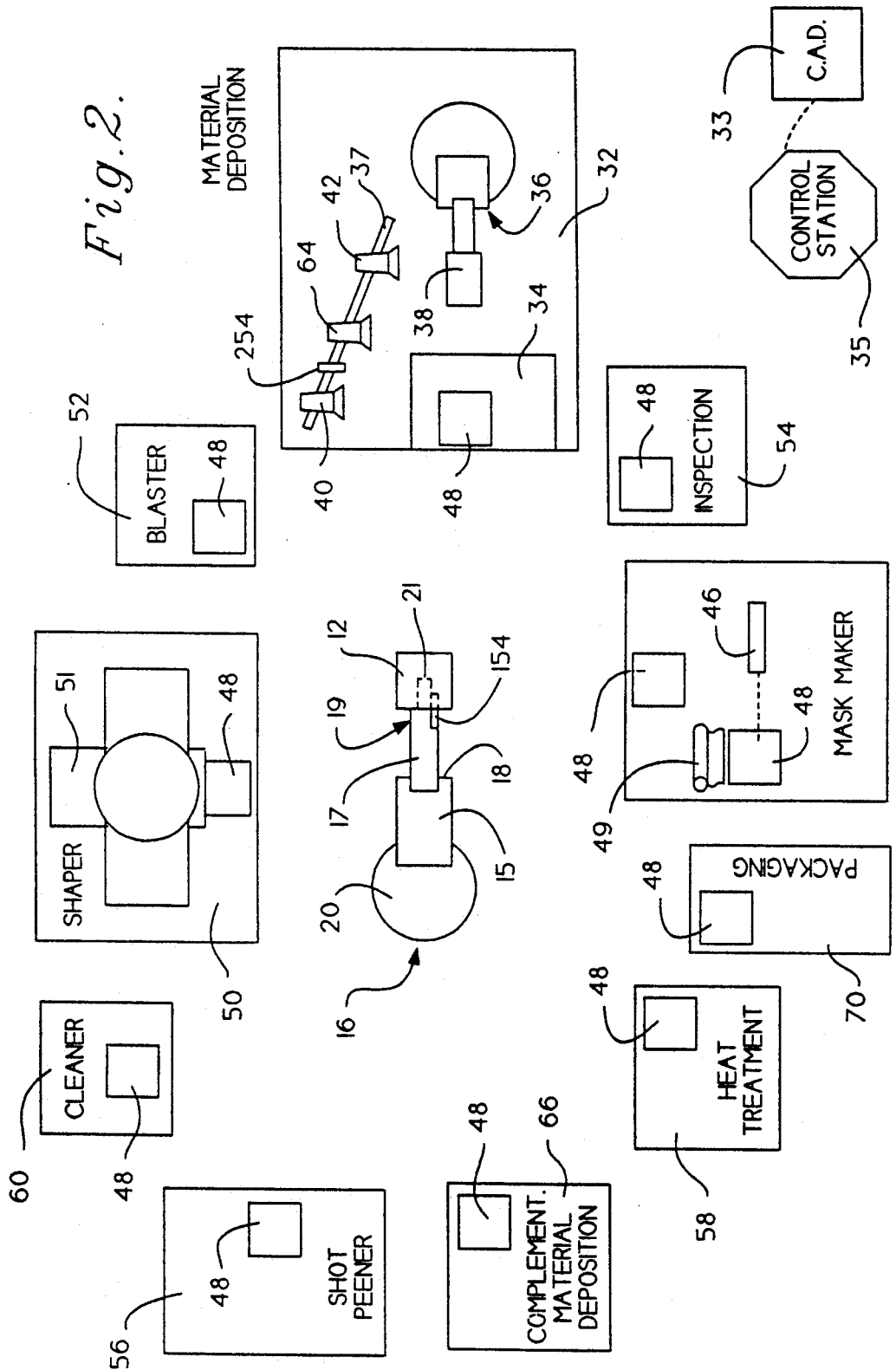
FIG. 2 is a schematic view of our preferred automated system.

Referring to FIG. 2, the deposition material is applied to a substrate placed on the movable work surface 12 at a deposition station 32. Once a layer has been deposited onto the movable work surface 12, the work surface 12 is selectively transferred to at least one of a series of processing stations where a processing function is performed on the layer of deposition material. Each of the processing stations are sized and positioned to receive the work surface 12. Once the layer has been processed, the work surface 12 is moved back to the deposition station 32 and the next layer is applied. Each layer is applied and processed until the article is completely manufactured. Preferably, a control station 35 is provided for automatically controlling the transfer apparatus and at least some of the processing stations. The control system responds to a CAD system 33 containing data required to make the article.

An article transfer apparatus 16 moves the work surface 12 and any layers deposited thereon between the processing stations and the deposition station 32. The Motoman K100S robot is the preferred transfer apparatus. The transfer apparatus 16 has a movable base 20 and a pivoting arm 18 comprised of lower segment 15 and upper segment 17. The lower segment 15 is attached to the movable base 20. The distal end of the upper segment 17 has a tongue 21 which is sized and configured for carrying the movable work surface 12. The movable base 20 is preferably rotatable. The processing stations may be stations for performing any processing function but the preferred embodiment includes a mask maker 62, a shaper 50, a blaster 52, an inspection station 54, a shot peener 56, a heat treatment unit 58, a cleaner 60 and packaging station 70. The processing stations are preferably arranged in an approximately circumferential fashion around the article transfer apparatus 16. The extendable arm 18 is able to move in two planes and can be rotated through a third plane. The arm can extend and retract while carrying the movable work surface 12 thereon.

The deposition station preferably consists of a work table 34 having a receiver 48 that is sized and positioned to receive the movable work surface 12, and a robotic device 36 which can acquire various processing heads for depositing layers onto the work surface 12. The preferred robotic device is a GMF S700 robot. The preferred delivery system for layer deposition is the Miller BP400 Arc Spray System. The robotic device 36 is similar to transfer apparatus 16 and is able to move in three dimensions. The robotic device 36 has a tool changing mechanism 38 which can acquire one of a series of processing heads 40, 42 and 64 from rack 37. The robotic device 16 places the work surface 12 on a receiver 48 positioned on the work table 34. Then robot 36 selects a processing head and moves the selected head, such as sprayer head 40, over the work surface to deposit layers of deposition material 31. Although only one spray head 40 is shown, it may be advantageous to use multiple spray heads. Also, although the preferred means of delivering the deposition material 31 is by thermal spray deposition, any suitable means such as welder head 42 or a liquid slurry nozzle (not shown) may be used. The Plasma-Technik A-3000-4/2 Plasma Spray System and the Thermal Dynamics WC-100/PS30A Welding System are examples of suitable material delivery systems. After each layer is applied we prefer to move work surface 12 from the deposition station to other processing stations.

When masks are used, the work surface is delivered to the mask making station by the transfer apparatus 16. The transfer apparatus moves about its movable base 20 so as to face the mask making processing station 62. The extendable arm 18 then extends causing the movable work surface 12 to be placed on a receiver 48 within the mask making station 62. The mask making station 62 has a supply of mask material 49 and a laser 46 for cutting out masks from the mask material 49. The mask cutting station preferably incorporates a Melles Griot Model CRF 222 $CO_2$ laser. The transfer apparatus 18 may either hold the work surface 12 within the mask maker station or may deposit the work surface 12 within the station and retract, reextending to pick up the work surface 12 once the mask process is completed.

After the mask is formed and placed on the work surface 12, the transfer apparatus extendable arm 18 is then retracted removing the work surface 12 from the mask making station 62. The transfer apparatus then moves about its movable base 20 so that it is facing the deposition station 32. The transfer apparatus extendable arm 18 extends, placing the work surface 12 into the material deposition station 32. The transfer apparatus 16 places the work surface 12 on receiver 48 on the work table 34 in the deposition station 32. The deposition station robotic unit 36 moves the spray head over the work surface 12 to deposit the next layer. The robotic unit 36 preferably is able to move in three dimensions to direct the delivery of deposition material 31. Once the layer 14 has been deposited onto the work surface 12, the transfer unit 16 removes the work surface with a layer of material deposited thereon from the deposition station 32. Although it is preferred that the spray heads 40 move relative to the work surface during deposition of each layer, the work surface may be moved relative to the spray heads.

The transfer apparatus 16 rotates about movable base 20 so as to face the shot peener 56. The extendable arm 18 extends carrying the work surface 12 into the shot peening station 56. The extendable arm 18 places the work surface 12 on a receiver 48 in the shot peening station 56 and retracts. The layer is then shot peened. A Pro-Finish Model 2636 shot-peener cabinet is preferred. This cabinet has a shot peening nozzle which can be manipulated by robot 16. Once the process is finished, the extendable arm 18 extends into the shot peening station to pick up the work surface carrying the processed layer of deposition material. The extendable arm 18 is then retracted removing the work surface 12 and the layer deposited thereon from the shot peener 56. The transfer apparatus then rotates so as to return the work surface to the deposition station 32 or may be directed toward the shaping station 50.

Facing the shaping station the transfer apparatus extends the extendable arm 18 carrying the work surface 12 and the layer deposited thereon into the shaping station 50. The preferred shaping apparatus is a computer numerically controlled machine (CNC machine 51) that has suitable shaping tools such as a sander, a milling tool, grinder or polisher attached thereto. The extendable arm retracts away from the shaping station 50 leaving the work surface 12 on a receiver 48 in the CNC machine. The shaping station preferably employs a Fadal Model 6030 CNC machine that cooperates with a Tsudakoma Model 301 Rotary/Tilt Table. The shaping operation is then performed by the CNC machine. When the shaping operation is complete, the transfer apparatus extendable arm 18 extends to the shaping apparatus where it engages the work surface 12. The extendable arm 18 is then retracted removing the work surface 12 and the layer of deposition material 31 thereon from the CNC machine.

The transfer apparatus 16 may next move so as to face the heat treatment unit 58. The transfer apparatus extendable arm 18 then extends carrying the work surface 12 to the heat treatment unit 58 and placing it on a receiver 48 therein. Once the work surface 12 and the layer thereon has been placed with the heat treatment unit 58, the extendable arm 18 is retracted. The heat treatment process is performed, then the extendable arm 18 removes the work surface 12 and the layer for further processing.

In a similar fashion, the transfer apparatus 16 moves the work surface 12 and the layer thereon to a cleaning station 60 where the layer is cleaned. An inspection station 54 is also provided. At selected stages of the manufacturing process, the work surface 12 and layer of deposition material 31 are transported by the transfer apparatus to an inspection station 54. Although the inspection station 54 is preferably an independent processing station, the inspection function may be performed by an optional inspection sensor 154 (shown in dotted line in FIG. 2) attached to the transfer apparatus 16 or sensor 254 which can be acquired by the deposition station robot 36. Once the inspection has been performed and it has been determined that no additional processing is required, the work surface is moved by the transfer apparatus once again through the deposition and processing stations to apply a next layer of deposition material 31. The above-described steps are repeated until all of the layers have been deposited and all selected layers have been processed, such that a complete article has been manufactured. The completed article may then be taken to packaging station 70 for packaging and shipping.

It is understood that although it is preferred that the work surface and layers are transported through each of the process stations mentioned above, some or all of the processing stations may be utilized for each layer, or for some layers but not others. Moreover, several articles could be simultaneously made in the system each being at a different station at any given time. It is further understood that the order in which the work surface and layers are brought through the processing stations may be altered as is desired. For example, although it is preferred that a complementary material such as masks be used in the application of the deposition material 31, the deposition material 31 may be applied without complementary material. In this alternative, the work surface and layer are moved to the shaping station from the deposition station, where the layer is shaped by the CNC machine to its appropriate configuration. The layer is then processed as described above and the steps are repeated.

The masks described in the first preferred embodiment act as a means for achieving the desired profile of each layer of deposited material. The masks also act as a support for the deposition material 31 of that layer. In a second preferred embodiment, a complementary material is sprayed or otherwise applied to the layer to support the deposition material 31 for each layer. In this embodiment, the masks 44 may or may not be used to direct the application of the deposition material 31 and the complementary material. In the present invention, any means of delivering the complementary material is acceptable. However, in the preferred embodiment of the present invention, we employ a thermal spray deposition means. Thus, two sets of masks may be used. A set of masks for the deposition material 31 as described above and a second set of masks that contain at least one mask corresponding to each mask from the set of masks for the deposition material 31 and that defines a complement to the cross section defined by that corresponding mask. The complementary material delivery means 64 may be located within the material deposition station 32 or may be located in a separate remote station 66. When two sets of masks are used, the work surface 12 is preferably first moved to the mask making station 62 where a complementary mask is positioned above the work surface. The work surface is then moved by the transfer apparatus 16 to the complementary delivery station 66 or the complementary material delivery means 64 in the material deposition station 32 where a layer of complementary material is applied. The complementary material mask is then removed and the work surface 12 with the layer of complementary material deposited thereon are moved back to the mask making station 62. A deposition material mask is then positioned over the work surface 12. The work surface 12 with the layer of complementary material and the mask thereon is then moved by the transfer apparatus 16 to the deposition station 32 where deposition material 31 is applied. The transfer apparatus 16 removes the work surface with the layer of complementary material and deposition material 31 and transfers them to the processing stations.

An alternative embodiment eliminates the need of using masks all together. First, the work surface 12 is moved by the transfer apparatus 16 to the complementary material delivery station 66 where a layer of complementary material is applied to a substrate on the work surface 12. The transfer apparatus 16 then removes the work surface and complementary material from the complementary material delivery station and transfers them to the shaping station 50. Once the transfer apparatus 16 has extended the work surface 12 with the complementary material thereon to the shaping station 50, placed the work surface on the shaping means and has retracted, the shaping means passes over the complementary material shaping and contouring the complementary material surface. The surface of the complementary material is shaped and contoured so as to define the surface of the object being produced for that layer. The transfer apparatus 16 then extends to the shaping apparatus 50 and removes the work surface from the shaping means 50 and transfers the work surface to deposition material 31 delivery station 32. Once the work surface is placed in the deposition material delivery station 32, deposition material 31 is applied as described above. The transfer apparatus removes the work surface 12 from the deposition material station 32 and transfers the work surface 12 back to the shaping station 50 where in the deposition material 31 is shaped as desired. This process is repeated for each layer until the final block f material is produced. Once the final block of material is produced, the complementary material and substrate are then removed. Conversely, each deposition material layer 31 may first be applied and shaped and then the corresponding layer of complementary material may be applied.

Variations of the preferred embodiments could be made, for example, although the preferred apparatus for shaping each layer is a CNC machine, any grinder, sander, polisher or other suitable shaping means may be used.

Also, although the movable base 20 of the transfer apparatus 16 preferably rotates, it may be mounted in any movable fashion so as to access the deposition and processing stations. For example, the various stations could be arranged along a single line or two parallel lines. Then the transfer apparatus would move along a line parallel to such stations.

While present preferred embodiments of the invention have been shown, it is distinctly understood that the invention is not limited thereto but may be otherwise variously embodied within the scope of the following claims.

We claim:

1. An automated system for manufacturing an article that is formed by the incremental buildup of layers onto a work surface comprising:
    a movable work surface onto which layers are deposited to form the article;
    a material deposition station sized and positioned to receive the moveable work surface, where each layer of the article is deposited onto at least one of the work surface, a substrate placed on the work surface and a preceding layer, wherein each layer deposited on a preceding layer is simultaneously deposited and bonded to the preceding layer to form a portion of the article;
    at least one processing station sized and positioned to receive the moveable work surface, each processing station capable of performing a desired operation on selected layers of the article; and
    an article transfer apparatus sized and positioned for repetitively placing, removing and returning the work surface and any layers formed thereon at the deposition station and at the at least one processing station until each layer is processed and a completely manufactured article is produced.

2. The system of claim 1 wherein the material deposition station is a thermal spray deposition assembly.

3. The system of claim 1 wherein the material deposition station is a weld deposition assembly.

4. The system of claim 1 wherein the processing stations include at least one group consisting of a shot peener, a cleaner, a heat treatment unit, a blaster, a shaper, an inspection device and a mask maker.

5. The system of claim 1 also comprising a control station for automatically operating at least one of the article transfer station and at least one processing station.

6. An automated system for manufacturing an article that is formed by the incremental buildup of layers onto a work surface comprising:
    a moveable work surface onto which layers are deposited to form the article;
    a material deposition station sized and positioned to receive the moveable work surface, where each layer of the article is deposited onto at least one of the work surface, a substrate placed on the work surface and a preceding layer;
    at least one processing station sized and positioned to receive the moveable work surface, each processing station capable of performing a desired operation on selected deposited layers of the article;
    a complementary material deposition means for applying complementary material to at least one of the work surface and selected layers of deposition material, the complementary deposition means positioned in one of the material deposition station and a separate processing station; and
    an article transfer apparatus sized and positioned for repetitively placing, removing and returning the work surface and any layers formed thereon at the deposition station and at the at least one processing station until each layer is processed and a completely manufactured article is produced.

7. An automated system for manufacturing an article that is formed by the incremental buildup of layers onto a work surface comprising:
    (a) a moveable work surface onto which layers are deposited to form the article;
    (b) a material deposition station sized and positioned to receive the moveable work surface, where each layer of the article is deposited onto at least one of the work surface, a substrate placed on the work surface and a preceding layer, wherein the deposition station comprises:
        (i) a work table for receiving the moveable work surface;
        (ii) a series of material delivery devices for depositing material onto at least one of the moveable work surface and a preceding layer of deposited material, the devices including at least one of thermal spray heads and welders; and
        (iii) a robotic device which can acquire at least one material delivery device and move the acquired material delivery device relative to the work surface to apply a layer onto the work surface;
    (c) at least one processing station sized and positioned to receive the moveable work surface, each processing station capable of performing a desired operation on selected deposited layers of the article; and
    (d) an article transfer apparatus sized and positioned for repetitively placing, removing and returning the work surface and any layers formed thereon at the deposition station and at the at least one processing station until each layer is processed and a completely manufactured article is produced.

8. The system of claim 7 wherein the work table is movable relative to the robotic device.

9. The system of claim 7 also comprising an inspection device attached to the robotic device.

10. A method of manufacturing an article that is formed by the incremental buildup of layers on a work surface, comprising the steps of:
    a) providing a moveable work surface on which layers are deposited, the moveable work surface being moveable by an article transfer apparatus;
    b) placing the moveable work surface in a material deposition station where at least one layer of deposition material is deposited onto at least one of the work surface and a preceding layer, wherein each layer deposited on a preceding layer is simultaneously deposited and bonded to the preceding layer to form a portion of the article;

c) removing the moveable work surface from the material deposition station;

d) placing the moveable work surface and any layers deposited thereon in at least one processing station, where each processing station performs a desired function on selected layers;

e) removing the moveable work surface having at least one processed layer thereon from the processing station; and f) repeating at least some of steps b through e until all layers have been deposited and all selected layers have been processed.

11. The method of claim 10 wherein the deposition station is a thermal spray deposition assembly.

12. The method of claim 10 wherein the deposition station is a weld deposition assembly.

13. The method of claim 10 wherein the processing stations include at least one of a shot peener, a cleaner, a blaster, a heat treatment unit, a shaper, an inspection device and a mask maker.

14. The method of claim 10 further comprising the step of inspecting selected layers.

15. The method of claim 10 also comprising the steps of placing a substrate on the work surface and depositing the deposition material on the substrate.

16. The method of claim 10 wherein at least one of the steps is automatically controlled by a control station.

17. The method of claim 16 wherein the control station responds to data from a CAD system.

18. The method of claim 16 wherein a plurality of movable work surfaces are provided to permit a plurality articles to be manufactured simultaneously.

19. A method of manufacturing an article that is formed by the incremental buildup of layers on a work surface, comprising the steps of:

(a) providing a moveable work surface on which layers are deposited, the moveable work surface being moveable by an article transfer apparatus;

(b) placing the moveable work surface in a material deposition station where at least one layer of deposition material is deposited onto at least one of the work surface and a preceding layer;

(c) removing the moveable work surface from the material deposition station;

(d) placing the moveable work surface and any layers deposited thereon in at least one processing station, where each processing station performs a desired function on selected deposited layers;

(e) applying a layer of a complementary material before one of steps b and d; and (f) removing the moveable work surface having at least one processed layer thereon from the processing station;

(g) repeating at least some of steps b through f until all layers have been deposited and all selected layers have been processed.

* * * * *

UNITED STATES PATENT AND TRADEMARK OFFICE
CERTIFICATE OF CORRECTION

PATENT NO. : 5,301,863
DATED : April 12, 1994
INVENTOR(S) : FRITZ B. PRINZ, LEE E. WEISS It is certified that error appears in the above-indentified patent and that said Letters Patent is hereby corrected as shown below:

Column 7, line 54, delete "group consisting".

Signed and Sealed this

Second Day of August, 1994

Attest:

BRUCE LEHMAN

*Attesting Officer*          *Commissioner of Patents and Trademarks*